United States Patent [19]

Gousetis et al.

[11] Patent Number: 4,629,602

[45] Date of Patent: Dec. 16, 1986

[54] PHOSPHOSILICONE/SILICATE COPOLYMERS AND THEIR USE AS CORROSION INHIBITORS AND SILICATE STABILIZERS IN ANTIFREEZES

[75] Inventors: Charalampos Gousetis; Knut Oppenlaender, both of Ludwigshafen; Gert Liebold, Edingen-Neckarhausen; Klaus Pfitzner, Ludwigshafen, all of Fed. Rep. of Germany

[73] Assignee: BASF Aktiengesellschaft, Ludwigshafen, Fed. Rep. of Germany

[21] Appl. No.: 793,086

[22] Filed: Oct. 30, 1985

[30] Foreign Application Priority Data

Nov. 3, 1984 [DE] Fed. Rep. of Germany ....... 3440194

[51] Int. Cl.[4] .......................... C09K 5/00; C08G 77/22
[52] U.S. Cl. .......................................... 422/7; 252/75;
252/78.3; 252/78.5; 528/30; 528/43; 528/398
[58] Field of Search ........................ 252/75, 78.3, 78.5;
528/30, 43, 398

[56] References Cited

U.S. PATENT DOCUMENTS

| | | | |
|---|---|---|---|
| 3,312,622 | 4/1967 | Pines et al. | 252/75 |
| 3,780,127 | 12/1973 | Young | 585/639 |
| 3,816,550 | 6/1974 | Young | 525/479 |
| 4,370,255 | 1/1983 | Plueddemann | 252/78.3 |

FOREIGN PATENT DOCUMENTS 2219983  9/1975  Fed. Rep. of Germany .

OTHER PUBLICATIONS

S. N. Borison et al., "Organosilicon Derivatives of Phosphorus and Sulfur", Plenum Press, New York--London 1971, p. 94.
Ullmann, "Enzyklopaedie der Technischen Chemie", 4th ed. vol. 12, p. 205.
Barnes, Jr. et al., J. Org. Chem. 25, 1191 (1960).

*Primary Examiner*—Paul Lieberman
*Assistant Examiner*—Robert A. Wax
*Attorney, Agent, or Firm*—Keil & Weinkauf

[57] ABSTRACT

Organosilane/silicate copolymers obtainable by reacting an organic phosphosilicon compound of the formula I

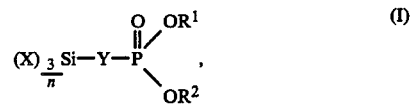

where n, X, Y, $R^1$ and $R^2$ have the meanings stated in the description, with an alkali metal silicate, radiator antifreezes containing these compounds, their use as corrosion inhibitors in radiator antifreezes based on glycol, a method of inhibiting corrosion of aluminum by aqueous cooling media, containing radiator antifreeze based on glycol, during the cooling of internal combustion engines, and the use of organic phosphosilicon compounds for stabilizing silicates.

10 Claims, No Drawings

PHOSPHOSILICONE/SILICATE COPOLYMERS AND THEIR USE AS CORROSION INHIBITORS AND SILICATE STABILIZERS IN ANTIFREEZES

The present invention relates to novel organosilane/silicate copolymers, radiator antifreezes based on glycol and containing a small amount of these compounds, their use as corrosion inhibitors in radiator antifreezes based on glycol, a method of inhibiting corrosion of aluminum by aqueous cooling media containing radiator antifreeze based on glycol during the cooling of internal combustion engines, and the use of organic phosphosilicon compounds for stabilizing silicates.

Radiator antifreezes which reduce the freezing point and thus act as a preventative measure ensuring trouble-free operation at below 0° C. are usually added to water, being the most important cooling liquid for internal combustion engines. Such radiator antifreezes are based on glycol, in particular ethylene glycol and propylene glycol.

However, when radiator antifreezes are used, it is absolutely necessary to add corrosion inhibitors since the glycol/water mixtures obtained as a cooling medium have a greater tendency than pure water to corrode the materials used in the cooling system, for example cast iron, unalloyed steel, aluminum, copper or brass.

In light-weight construction where aluminum and aluminum alloys are used for radiator and engine construction, cavitation corrosion which leaves pits in the metal surfaces must be avoided, particularly in high-speed diesel engines.

It is known that alkali metal silicates, for example waterglass or sodium metasilicate, can be used as corrosion inhibitors for aluminum. However, alkali metal silicates are relatively poorly soluble in the radiator antifreezes based on glycol and in their aqueous mixtures which are subsequently used as a cooling medium.

In order to produce a stable solution of the 250 ppm (calculated as $SiO_2$ and based on the undiluted radiator antifreeze, ie. the antifreeze before it is mixed with water) of silicate required for inhibiting corrosion of aluminum, it is necessary to add a silicate stabilizer.

DE-A-2 912 430 proposes the use of compounds which possess the structural element ... $Si-(CH_2)_n-O-P$ ... (n=1 to 3), for example a component of the formula III

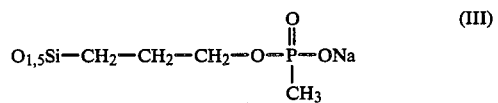

for stabilizing soluble silicates.

A comparative example (Table A, sample C) carried out there (loc. cit.) shows that the disodium salt of a product of the formula IV

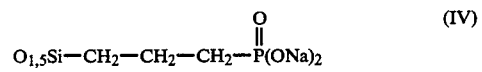

in which the propylene chain is bonded directly to the phosphorus atom (ie. without an oxygen bridge), is completely ineffective as a silicate stabilizer.

In contrast, it was surprising, and could not be foreseen by the skilled worker, that, in particular, the monoalkali metal salts of phosphonic acid monoesters belonging to the last-mentioned class of compounds, and their intermediates (completely esterified at the silicon and phosphorus atoms) can be very successfully used for stabilizing silicates.

We have found novel organosilane/silicate copolymers which can be obtained by reacting an organic phosphosilicon compound of the general formula I

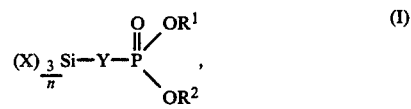

where Y is a divalent aliphatic or cycloaliphatic radical of 1 to 10 carbon atoms or a phenylenealkylene group of 7 to 10 carbon atoms and n can be 1 or 2, and when n is 1, X is an $OR^3$ group in which $R^3$ is a straight-chain, branched or cyclic alkyl chain of 1 to 13 carbon atoms which may be interrupted by oxygen atoms or is acyl of not more than 9 carbon atoms, and $R^1$ and $R^2$ are identical or different and are each a straight-chain, branched or cyclic alkyl group of 1 to 13 carbon atoms which may be interrupted by oxygen atoms, or is an aryl or aralkyl group of not more than 20 carbon atoms, and when n is 2, X is oxygen and $R^1$ is an alkali metal and $R^2$ has the above meanings, with a silicate of the general formula II

where M is an alkali metal and q is from 0.4 to 4, in a weight ratio of from 1:1 to 1:10 at from 30° to 150° C.

The novel compounds can advantageously be used as corrosion inhibitors for radiator antifreezes based on glycol, and advantageously inhibit the corrosion of aluminum by aqueous cooling media containing radiator antifreezes based on glycol during the cooling of internal combustion engines when they are added to the radiator antifreeze in an amount of from 500 to 5000 ppm, based on the said antifreeze.

For the purposes of the present invention, a radiator antifreeze is the silicate-containing glycol-based formulation which has not yet been mixed with water.

Such radiator antifreezes are well known and are described in, for example, Ullmann's Enzyklopädie der Technischen Chemie, 4th Edition, volume 12, page 205 et seq.

To inhibit the corrosion of aluminum, it is usually provided with alkali metal silicates of the above formula II, for example an alkali metal orthosilicate, an alkali metal metasilicate, an alkali metal tetrasilicate or an alkali metal silicate, the sodium compounds preferably being used.

These silicates are advantageously stabilized by the organic phosphosilicon compounds of the above formula I.

Those organic phosphosilicon compounds of the formula I in which n is 1 can be prepared by the following conventional methods:

(a) addition of dialkyl phosphites to alkenyltrialkoxysilanes in the presence of free radical formers or (b) reaction of di- or trialkyl phosphites with haloalkyltrialkoxysilanes.

Some of the members of this class of compounds are known and are described in, for example, J. Org. Chem.

25, (1960), 1191, DE-A-2 219 983 and DE-A-2 304 544 (Method (a)) and U.S. Pat. No. 3,780,127 and U.S. Pat. No. 3,816,550 (Method (b)). Other compounds are described in "Organosilicon Derivatives of Phosphorus and Sulfur" by S. N. Borisov, M. G. Voronkov and E. Ya. Lukevits, Plenum Press, New York-London 1971, page 94 et seq.

In formula I above, Y is, as stated above, a divalent aliphatic or cycloaliphatic radical of 1 to 10 carbon atoms or phenylenealkylene of 7 to 18, preferably 7 to 10, carbon atoms.

Divalent aliphatic radicals are straight-chain or branched alkylene or alkenylene groups, eg. methylene, ethylene, propylene, butylene, hexylene, methylpropylene, butenylene or hexenylene.

Examples of cycloaliphatic radicals are ethylenecyclohexylene and propylenecyclohexylene.

Phenylenealkylene is, for example, phenylenemethylene or phenyleneethylene.

Y is preferably a straight-chain or branched alkylene of 1 to 6 carbon atoms, particularly preferably ethylene, propylene, butylene or isobutylene.

In formula I where n is 1, $R^1$, $R^2$ and $R^3$ are each preferably alkyl of 1 to 4 carbon atoms.

When n is 2, $R^1$ is preferably sodium or potassium.

The organic phosphosilicon compounds of the formula I where n is 2 are obtained via the phosphosilicon compounds of the formula I wherein n is 1, which have been described above and have the structural element $(R^3O)_3Si-$. They are obtained by reaction in an aqueous alkali metal hydroxide solution at from 70° to 100° C. in the course of from 10 to 20 hours. These compounds are phosphonoalkylsiloxanes.

The novel organosilane/silicate copolymers either may be formed in situ, during the production of the radiator antifreeze formulation, by reacting the alkali metal silicates present there with the organic phosphosilicon compound of the formula I in a weight ratio of from 1:1 to 10:1, preferably from 2:1 to 8:1, or can be prepared separately beforehand.

In this case, an appropriate amount of the organic phosphosilicon compound of the formula I is added to the alkali metal silicate, and the mixture is stirred at from 30° to 150° C., preferably from 30° to 80° C., in glycol or water or a glycol/water mixture for from 5 to 10 hours. The resulting organosilane/silicate copolymer, which contains about 50-90, preferably 65-90, % by weight, based on the sum of the two reactants, of silicate, can then be added to the radiator antifreeze formulation containing the remaining components.

The novel organosilane/silicate copolymers are added to the radiator antifreeze in an amount of from 500 to 5000 ppm, in particular from 200 to 800 ppm, based in each case on the radiator antifreeze.

The radiator antifreeze may contain other conventional corrosion inhibitors, for example borates, nitrites, nitrates or benzoates, as well as antifoams or other assistants (cf. Ullmann, loc. cit.).

To prepare the cooling media, water is added to the radiator antifreeze according to the invention and, advantageously, from 20 to 50% strength by volume aqueous solutions are prepared in this manner.

The products according to the invention have an excellent action as corrosion inhibitors for aluminum, and the novel radiator antifreezes exhibit advantageous silicate stability both in the undiluted state and in aqueous solution.

The Examples which follow illustrate the invention.

EXAMPLES

A radiator antifreeze having the following composition (in % by weight) was formulated:
ethylene glycol: 92.0
water: 2.9
borax ($Na_2B_4O_7.5H_2O$): 1.7
sodium nitrate: 0.4
sodium nitrite: 0.5
sodium benzoate: 2.0
sodium metasilicate ($Na_2SiO_3.5H_2O$): 0.3
sodium hydroxide: 0.05
toluenetriazole: 0.1
organic phosphosilicon compound*: 0.05

*The organic phosphosilicon compound used is a product having the following structural formula

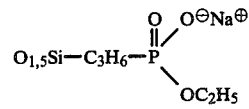

The organosilane/silicate copolymer was formed in situ by reaction with the sodium metasilicate present.

The silicate stability was demonstrated by means of storage tests at 80° C., both the formulated, undiluted radiator antifreeze and a 33–50% strength by volume aqueous solution being stored.

The water used for this purpose corresponded to that employed in the radiator antifreeze corrosion test according to ASTM 1384, ie. it contained 100 ppm of chloride, 100 ppm of sulfate and 100 ppm of bicarbonate (the sodium salts being used) as well as 275 ppm of calcium chloride. (Water which contains these components is also used by various automobile manufacturers in the hard water toleration tests for radiator antifreeze.)

In the storage test, assessment is carried out visually. The occurrence of compact or fluid sediment in the liquid and the formation of gelatinous deposits on the glass were considered adverse effects.

The test was complete after 28 days, the following results being obtained:

EXAMPLE 1

| | | sedimentation or gel formation | |
|---|---|---|---|
| (a) | pure radiator antifreeze containing organosilane/silicate copolymers | after 28 days | none |
| (b) | 50% strength by volume aqueous solution | after 28 days | none |
| (c) | 33% strength by volume aqueous solution | after 28 days | none |

EXAMPLE 2 (comparison)

| | | sedimentation or gel formation | |
|---|---|---|---|
| (a) | pure radiator antifreeze without organosilane/silicate copolymers | after 7 days | present |
| (b) | 50% strength by volume aqueous solution | after 2 days | present |
| (c) | 22% strength by volume aqueous solution | after 1 day | present |

The samples which did not exhibit any sedimentation or gel formation (Example 1) still contained 100% of the silicate initially present (calculated as SiO₂). Where sedimentation or gel formation occurred (Example 2), the value had dropped to 50% of the initial value.

The aqueous solutions (Examples 1(b) and 1(c)) also met the requirements in the corrosion test according to ASTM 1384. The measured increase or decrease in weight (in g/m²) of the metal test strips used in this test is stated below for the aqueous solution of Example 1(c):

- copper: −0.1
- soft solder: +0.3
- brass: −0.2
- steel: +0.1
- cast iron: −0.3
- cast aluminum: −0.2

We claim:

1. An organosilane/silicate copolymer obtained by reacting an organic phosphosilicon compound of the formula I

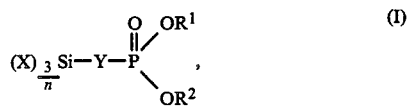

where Y is a divalent aliphatic or cycloaliphatic radical of 1 to 10 carbon atoms or a phenylenealkylene group of 7 to 10 carbon atoms and n can be 1 or 2, and when n is 1, X is an OR³ group in which R³ is a straight-chain, branched or cyclic alkyl group of 1 to 13 carbon atoms which may be interrupted by oxygen atoms or is acyl of not more than 9 carbon atoms, and R¹ and R² are identical or different and are each a straight-chain, branched or cyclic alkyl group of 1 to 13 carbon atoms which may be interrupted by oxygen atoms, or is an aryl or aralkyl group of not more than 20 carbon atoms, and when n is 2, X is oxygen and R¹ is an alkali metal and R² has the above meanings, with a silicate of the formula

where M is an alkali metal and q is from 0.4 to 4, in a weight ratio of from 1:1 to 1:10 at from 30° to 150° C.

2. An organosilane/silicate copolymer obtained by reacting a compound of the formula I as claimed in claim 1, where Y is a straight-chain or branched alkylene group of 1 to 6 carbon atoms and, when n is 1, R¹, R² and R³ are each alkyl of 1 to 4 carbon atoms, and, when n is 2, R¹ is sodium or potassium, with one of the stated silicates of the formula II.

3. A radiator antifreeze based on glycol, containing from 500 to 5000 ppm, based on the said antifreeze, of an organosilane/silicate copolymer which is obtained by reacting an organic phosphosilicon compound of the formula I

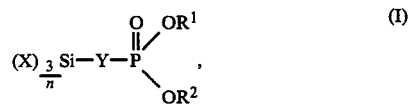

where Y is a divalent aliphatic or cycloaliphatic radical of 1 to 10 carbon atoms or a phenylenealkylene group of 7 to 10 carbon atoms and n can be 1 or 2, and when n is 1, X is an OR³ group in which R³ is a straight-chain, branched or cyclic alkyl group of 1 to 13 carbon atoms which may be interrupted by oxygen atoms or is acyl of not more than 9 carbon atoms, and R¹ and R² are identical or different and are each a straight-chain, branched or cyclic alkyl group of 1 to 13 carbon atoms which may be interrupted by oxygen atoms, or is an aryl or aralkyl group of not more than 20 carbon atoms, and when n is 2, X is oxygen and R¹ is an alkali metal and R² has the above meanings, with a silicate of the formula

where M is an alkali metal and q is from 0.4 to 4, in a weight ratio of from 1:1 to 1:10.

4. A radiator antifreeze based on glycol, containing an organosilane/silicate copolymer which is obtained by reacting a compound of the formula I as claimed in claim 3, where Y is a straight-chain or branched alkylene group of 1 to 6 carbon atoms and, when n is 1, R¹, R² and R³ are each alkyl of 1 to 4 carbon atoms, and when n is 2, R¹ is sodium or potassium, with one of the stated silicates of the formula II.

5. A radiator antifreeze as claimed in claim 3, wherein the organosilane/silicate copolymer is obtained by reacting an organic phosphosilicon compound of the formula I with a silicate of the formula II in situ in the radiator antifreeze.

6. A radiator antifreeze as claimed in claim 3, wherein the organosilane/silicate copolymer is obtained by reacting an organic phosphosilicon compound of the formula I with a silicate of the formula II in a separate stage.

7. Method of inhibiting corrosion of aluminum by an aqueous cooling medium containing a radiator antifreeze based on glycol during the cooling of an internal combustion engine, wherein from 500 to 5000 ppm, based on the said antifreeze, of an organosilane/silicate copolymer which is obtained by reacting an organic phosphosilicon compound of the formula I

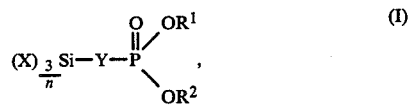

where Y is a divalent aliphatic or cycloaliphatic radical of 1 to 10 carbon atoms or a phenylenealkylene group of 7 to 10 carbon atoms and n can be 1 or 2, and when n is 1, X is an OR³ group in which R³ is a straight-chain, branched or cyclic alkyl group of 1 to 13 carbon atoms which may be interrupted by oxygen atoms or is acyl of not more than 9 carbon atoms, and R¹ and R² are identical or different and are each a straight-chain, branched or cyclic alkyl group of 1 to 13 carbon atoms which may be interrupted by oxygen atoms, or is an aryl or aralkyl group of not more than 20 carbon atoms, and when n is 2, X is oxygen and R¹ is an alkali metal and R² has the above meanings, with a silicate of the formula II

where M is an alkali metal and q is from 0.4 to 4, in a weight ratio of from 1:1 to 1:10, is added to the aqueous cooling medium.

8. A method as claimed in claim 7, wherein an organosilane/silicate copolymer which is obtained by reacting a compound of the formula I, where Y is a straight-chain or branched alkylene group of 1 to 6 carbon atoms, and when n is 1, $R^1$, $R^2$ and $R^3$ are each alkyl of 1 to 4 carbon atoms and, when n is 2, $R^1$ is sodium or potassium, with one of the stated silicates of the formula II, is added to the cooling medium.

9. A method as claimed in claim 7, wherein the organosilane/silicate copolymer added is obtained by reacting an organic phosphosilicon compound of the formula I with a silicate of the formula II in situ in the radiator antifreeze.

10. A method as claimed in claim 7, wherein the organosilane/silicate copolymer used is obtained by reacting an organic phosphosilicon compound of the formula I with a silicate of the formula II in a separate stage.

* * * * *